Jan. 17, 1956 A. E. DENTLER 2,731,258
FRICTION SNUBBER FOR RAILWAY CAR TRUCK SPRINGS
Filed Nov. 3, 1952
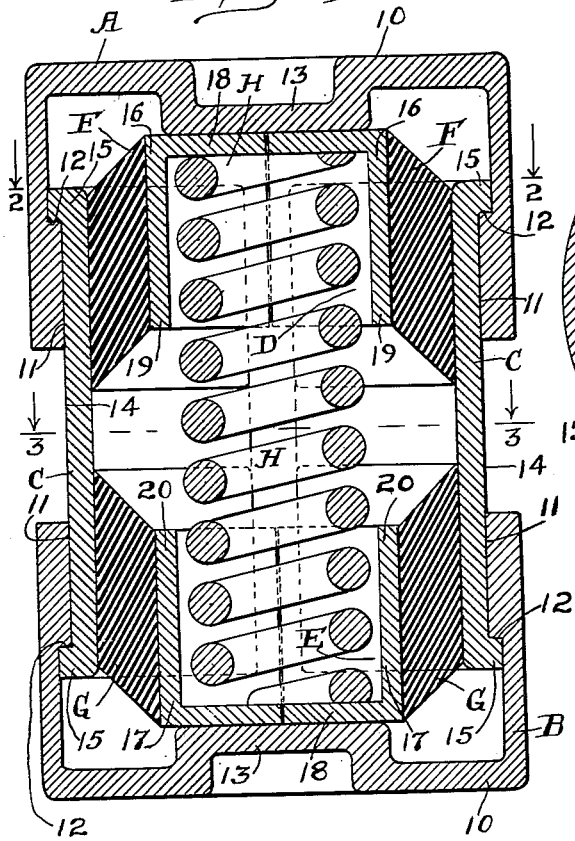
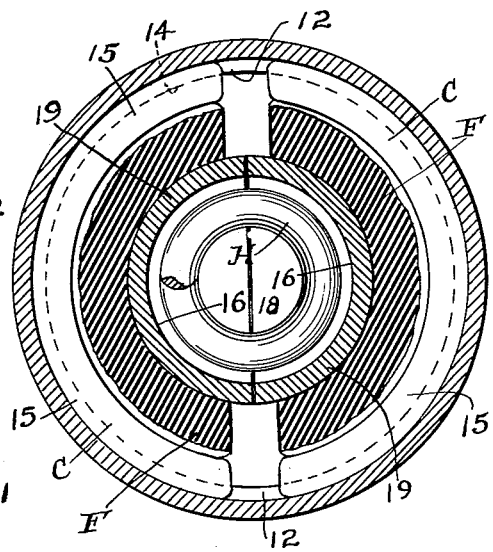
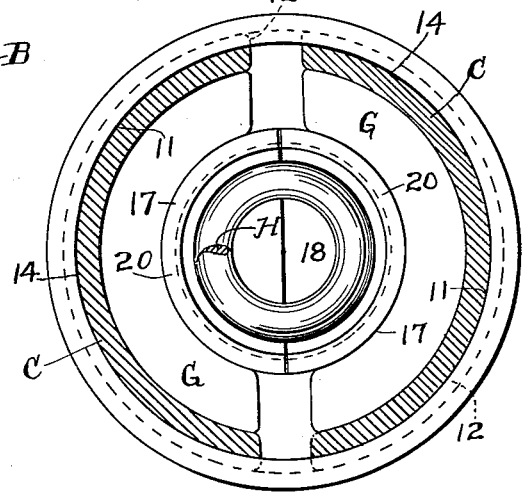
Inventor:
Arnold E. Dentler
By Henry Fuchs
Atty.

United States Patent Office 2,731,258
Patented Jan. 17, 1956

2,731,258

FRICTION SNUBBER FOR RAILWAY CAR TRUCK SPRINGS

Arnold E. Dentler, Western Springs, Ill., assignor to W. H. Miner, Inc., Chicago, Ill., a corporation of Delaware Application November 3, 1952, Serial No. 318,407

4 Claims. (Cl. 267—9)

This invention relates to improvements in friction shock absorbers, especially adapted for use in connection with truck springs of railway cars for snubbing the action of the springs.

One object of the invention is to provide a friction shock absorbing mechanism comprising a pair of friction casings having interior friction surfaces and being relatively movable toward and away from each other, friction shoes having their opposite ends telescoped within the casings in sliding frictional contact with the interior friction surfaces of said casings, and means for forcing the shoes into tight frictional engagement with the friction surfaces of the casing, and also yieldingly resisting relative movement of the casings toward each other.

A further object of the invention is to provide a mechanism as set forth in the preceding paragraph wherein the means for forcing the shoes into frictional engagement with the casings comprises rubber elements under compression, bearing on the inner sides of the shoes, and subjected to shear distortion during relative approach of the followers to yieldingly resist approach of the latter.

Other objects of the invention will more clearly appear from the description and claims hereinafter following.

In the accompanying drawing forming a part of this specification, Figure 1 is a transverse vertical sectional view of my improved shock absorbing mechanism.

Figures 2 and 3 are horizontal sectional views, corresponding respectively to the lines 2—2 and 3—3 of Figure 1.

As shown in the drawing, my improved shock absorbing mechanism comprises broadly top and bottom friction casings A and B, a pair of friction shoes C—C, in sliding frictional engagement with the casings, top and bottom follower caps D and E within the casings, top and bottom sets of rubber pads F—F and G—G interposed between the shoes and follower caps, and a coil spring H.

The top and bottom casings A and B are of similar design, each being in the form of a cylindrical tubular member, open at its inner end and closed at its outer end by a transverse wall 10, the wall 10 being at the upper end of the casing A and that of the casing B being at its lower end. Each casing is provided with opposed, interior friction surfaces 11—11 at its open end, and the cylindrical side wall inwardly of the friction surfaces 11—11 is interiorly cut away to form annular ledges providing retaining shoulders 12—12 at opposite sides of each casing, with which the shoes C—C cooperate to limit relative separation of the two casings A and B. The wall 10 of each casing has an inwardly extending, hollow central boss 13 thereon adapted to receive the usual spring centering lug with which the spring follower plates of railway car trucks are commonly provided.

The friction shoes C—C are in the form of transversely curved plates. These shoes are arranged at opposite sides of the mechansim and have their top and bottom ends extending into the top and bottom friction casings A and B. Each shoe C has a longitudinally extending friction surface 14 on its outer side extending from end to end of the same, which is engaged with the corresponding friction surfaces 11—11 of the casings A and B. At its top and bottom ends, each shoe is provided with laterally extending, out turned flanges 15—15 which are engaged in back of the shoulders 12—12 of the top and bottom casings to limit vertical separation of the casings and hold the parts of the mechanism assembled.

The top and bottom follower caps D and E are of similar design, each cap being divided or split centrally into two sections, as clearly shown in the drawings. The two parts or sections forming the top cap D are indicated by 16—16 and those forming the bottom cap E are indicated by 17—17. Each split cap D and E is of cylindrical shape and closed at one end by a transverse wall 18, the wall 18 of the cap D being at the upper end thereof and bearing on the boss 13 of the top casing A, and the wall 18 of the cap E being at its lower end and bearing on the boss 13 of the bottom casing B. The cylindrical walls of the sections 16—16 of the cap D are indicated by 19—19 and those of the sections 17—17 of the cap E are indicated by 20—20.

The rubber pads F—F and G—G are transversely curved, as clearly shown in Figures 2 and 3. The pads F—F are arranged within the casing A, at opposite sides of the mechanism, each pad F being interposed between the upper end portion of the corresponding shoe C and the section 16 of the cap D. The pads F—F are vulcanized to the inner sides of the shoes C—C and the outer sides of the walls 19—19 of the cap D and have their top and bottom ends cut away at an inclination, the same presenting top and bottom parallel end faces which are inclined upwardly in inward direction. The pads G—G are arranged within the casing B at opposite sides of the mechanism between the lower end portions of the shoes C—C and the sections 17—17 of the cap E, and are vulcanized to the same. The top and bottom ends of the pads G—G are cut away to present end faces, which are parallel and inclined upwardly in outward direction.

The spring H is in the form of a helical coil arranged centrally of the mechanism and has its top and bottom ends seated in the top and bottom caps D and E, respectively.

Preparatory to assembling the mechanism, the shoe C, pads F and G, and sections 16 and 17 of the split top and bottom caps of each side of the mechanism are joined together to form a unit. In assembling the mechanism, the two completed units are placed about the spring H and the cap sections 16—16 and 17—17 of the top and bottom split caps D and E are brought together over the top and bottom ends of said spring. The structure comprising the split caps D and E, pads F—F and G—G and the shoes C—C are then forcibly contracted laterally to an extent to allow the flanged top and bottom ends of the shoes to freely enter the top and bottom casings A and B, and held in this contracted position while said top and bottom casings are telescoped over the top and bottom ends of the shoes. When the flanges 15—15 and 15—15 of the shoes C—C have passed beyond the shoulders 12—12, the contracted structure is permitted to expand, thereby engaging the flanges 15—15 and 15—15 in back of the shoulders 12—12 of the top and bottom casings to hold the mechanism assembled. In the assembled condition of the mechanism, the rubber pads F—F and G—G are placed under compression, thereby forcing the shoes C—C tightly against the friction surfaces of the casings A and B.

As will be understood by those skilled in this art, my improved shock absorbing mechanism, when used in connection with railway car truck springs, is substituted for one of the spring coils or sets of coils of a cluster of such truck springs, and cooperates with the top and bottom spring follower plates of the spring cluster to snub the action of the latter.

In the operation of my improved shock absorbing mechanism, upon the springs of the cluster of the truck of a railway car being compressed, the top casing A is forced downwardly toward the bottom casing B, thereby producing relative longitudinal sliding movement between the friction surfaces of the casings A and B and the friction surfaces of the shoes. At the same time, the top follower cap D, which bears on the boss 13 of the casing A, is carried downwardly with the latter, thereby compressing the spring H and subjecting the rubber pads F—F and G—G to shearing stresses. As the rubber pads F—F and G—G are under lateral compression, they press the shoes C—C tightly against the friction surfaces of the casing. High frictional resistance for snubbing the truck springs is thus provided during compression of the mechanism. This frictional resistance is increased during compression due to the outward pressure exerted on the shoes C—C through the distortion of the rubber pads F—F and G—G. The capacity of the mechanism is still further augmented due to the resistance to downward movement of the casing A offered by the spring H and the rubber pads F—F and G—G.

It should be further noted that the spring H adds to the carrying capacity of the truck springs and facilitates release of the mechanism during recoil of the truck springs.

I claim:

1. In a friction shock absorbing mechanism, the combination with a pair of casings having interior friction surfaces said casings being relatively movable toward and away from each other; of friction shoes having their opposite ends slidingly engaged with said friction surfaces of said casings; sectional follower caps within said casings and engaged by the latter to be moved thereby, each section of each follower cap having a lengthwise extending wall, said walls of said sectional caps being opposed to the inner sides of said shoes; rubber pads under lateral compression interposed between and vulcanized to said walls of said frictional caps and said shoes; and a spring within said casings having its opposite ends seated within said sectional follower caps.

2. In a friction shock absorbing mechanism, the combination with a pair of casings having interior friction surfaces said casings being relatively movable toward and away from each other; of friction shoes having their opposite ends slidingly engaged with said friction surfaces of said casings; a follower cap within each casing engaged by said casing to be moved inwardly of the mechanism therewith, said follower cap being divided lengthwise into sections corresponding in number to said shoes, and respectively opposed to said shoes, each of said sections having a lengthwise extending wall; a rubber pad interposed between each of said sections and the corresponding shoe, said rubber pad being vulcanized to the lengthwise extending wall of said section and the inner side of the corresponding shoe; and a spring within said casings having its opposite ends seated in said follower caps.

3. In a friction shock absorbing mechanism, the combination with a pair of friction casings having interior friction surfaces, said casings being relatively movable toward and away from each other; of friction shoes having their opposite ends slidingly engaged with said friction surfaces of said casings; a rubber pad at each end of each shoe vulcanized to the inner side of said shoe; wall members corresponding in number to the number of said pads, each of which is vulcanized to the inner side of a pad, each of said wall members having a laterally inwardly extending follower flange bearing on the corresponding casing; and a spring within said casings opposing relative approach thereof, said spring bearing on the flanges of said wall members.

4. In a friction shock absorbing mechanism, the combination with a pair of friction casings having interior friction surfaces, said casings being relatively movable toward and away from each other; of friction shoes having their opposite ends slidingly engaged with said friction surfaces of said casings; a central member in each casing between said shoes, said central member being divided lengthwise into sections corresponding in number to said shoes, the sections being respectively opposed to said shoes, said central member being engaged by said casings and moved inwardly of the mechanism thereby; and a rubber pad interposed between each section and the corresponding shoe and vulcanized thereto, respectively.

References Cited in the file of this patent

UNITED STATES PATENTS

| | | |
|---|---|---|
| 2,265,392 | Olander | Dec. 9, 1941 |
| 2,306,394 | Light | Dec. 29, 1942 |
| 2,306,398 | Light | Dec. 29, 1942 |
| 2,336,969 | Tack | Dec. 14, 1943 |
| 2,523,479 | O'Connor | Sept. 26, 1950 |
| 2,606,018 | Olander | Aug. 5, 1952 |

FOREIGN PATENTS

| | | |
|---|---|---|
| 487,468 | Great Britain | June 21, 1938 |
| 553,606 | Great Britain | May 28, 1943 |